United States Patent [19]
Covington
[11] 3,869,567
[45] Mar. 4, 1975

[54] BLEMISH COMPENSATOR

[76] Inventor: Edward L. Covington, Rt. 3, Box 92, Claremore, Okla. 74017

[22] Filed: Aug. 20, 1973
[21] Appl. No.: 389,956

[52] U.S. Cl. .......................... 178/7.2, 178/DIG. 39
[51] Int. Cl. ............................................ H04n 5/21
[58] Field of Search....... 178/DIG. 39, 7.2, DIG. 26, 178/DIG. 41, 7.5 D, 7.5 R

[56] References Cited

UNITED STATES PATENTS 2,965,711 12/1960 James et al. .......................... 178/7.2

*Primary Examiner*—Richard Murray
*Assistant Examiner*—R. John Godfrey
*Attorney, Agent, or Firm*—Head & Johnson

[57] ABSTRACT

This abstract describes an apparatus for use in conjunction with a video camera when the camera tube has an area of its photosensitive surface which has a blemish. Such a blemish will cause a spot either of white or dark on any picture produced by the camera. Means are provided for presetting a sample and hold such that when the scanning beam of the camera approaches a selected area surrounding the blemish, the output line from the camera is switched open and a constant voltage is inserted into the video amplifier, which voltage is identical to the last video voltage prior to the opening of the switch. Thus, a selected rectangular area of size larger than the blemish is substituted for the blemish signal, the rectangular area being of a grayness, or color, identical to the preceding video signal on each of the horizontal scan lines.

6 Claims, 4 Drawing Figures

BLEMISH COMPENSATOR

BACKGROUND OF THE INVENTION

This invention lies in the field of video apparatus. Still more particularly it concerns apparatus for use with a video camera which has at least one blemish in its photosensitive surface.

Either during the manufacture or subsequent use of a camera, a blemish might be formed in the photosensitive surface. In the use of the camera, when the scanning beam passes across the photosensitive surface to create a video signal proportional to the light which has been received previously on each unit of the photosensitive surface, the voltage generated when the beam is on the blemish will create either a white or a black signal. This white or black signal will be in sharp contrast to the normal picture signal, and the blemish will cause a spot to be present in the displayed video picture. This spot remains in the same location on the face of the video display and is easily recognized as the result of a blemish in the camera.

Heretofore there has been no way shown of compensating for this blemish and when an individual camera acquires one or more blemishes that make its picture unsatisfactory, the camera tube must be replaced.

SUMMARY OF THE INVENTION

It is a primary object of this invention to provide a circuit for compensating for blemishes in the photosensitive surface of a video camera. It is a still more important object of this invention to provide a rectangular portion of the video display which has a gray scale, or color, which corresponds to the immediately preceding values on the raster of the display tube.

These and other objects are realized and the limitations of the prior art are overcome in this invention by providing a circuit which can generate a voltage pulse of selected magnitude whenever the scanning beam of the camera passes over a rectangular area of selected size and position on the photosensitive surface. A first pulse is generated in accordance with the timing of the horizontal lines of the raster, and a second voltage pulse is generated in synchronism with the color subcarrier frequency. These voltage pulses are connected to an AND gate. The output of the AND gate corresponds to a time situation when both voltage pulses are present. During this time the output of the gate controls a sample and hold circuit. This disconnects the output video signal of the camera tube from the video amplifier, and substitutes a constant voltage which is identical to the video signal immediately prior to the application of the voltage pulse. Thus, each of a selected group of lines of the horizontal scan has a short section of gray or color which corresponds to the immediately preceding values of the picture.

BRIEF DESCRIPTION OF THE DRAWINGS

These and objects of this invention and a better understanding of the principles and details of the invention will be evident from the following description taken in conjunction with the appended drawings, in which.

DESCRIPTION OF THE PREFERRED EMBODIMENT

Figures 1, 2, 3:
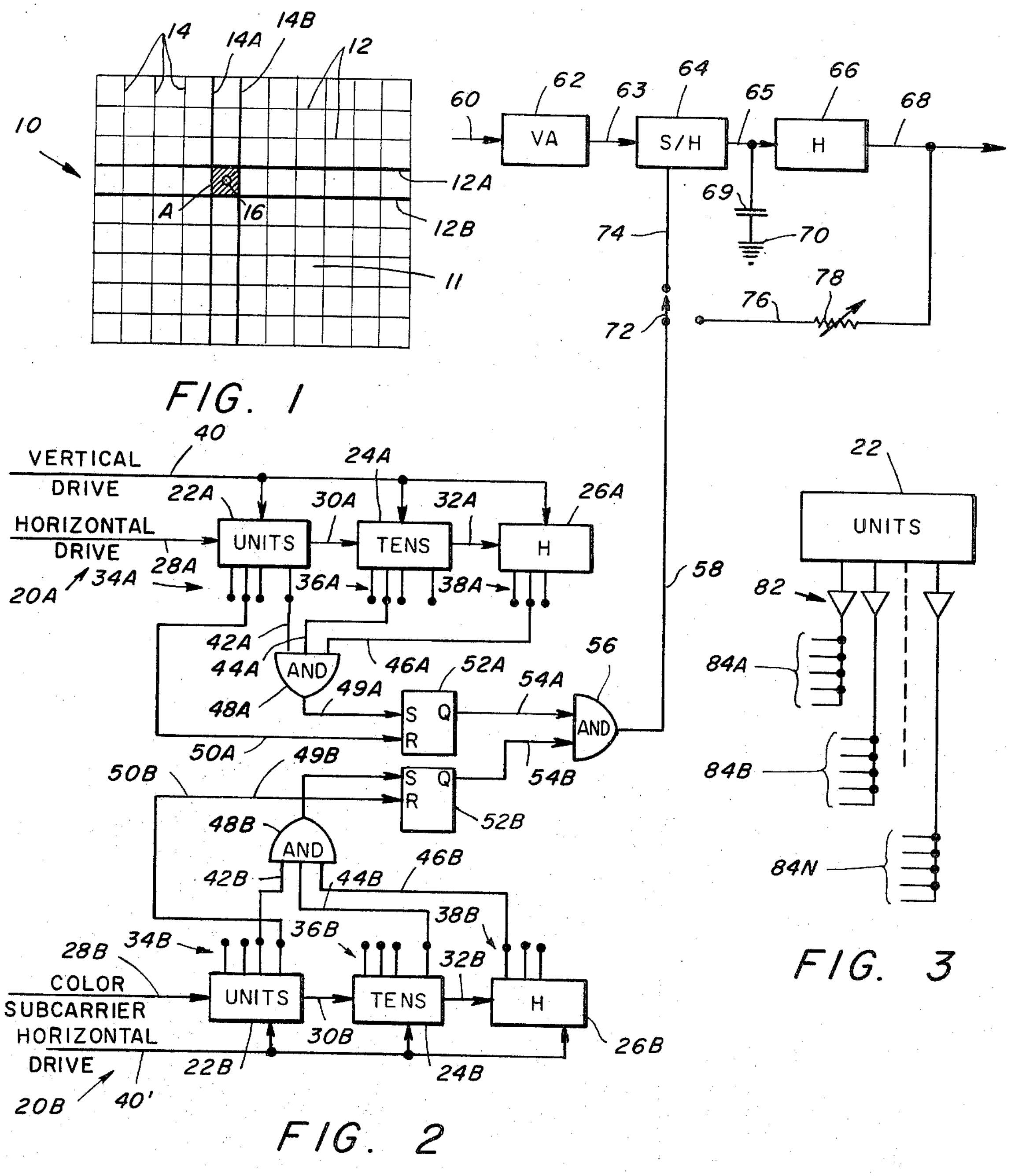
FIG. 1 represents a view of a video display tube where the camera has a blemish, and of a control area surrounding the blemish.
FIG. 2 indicates one embodiment of this invention for compensating for a blemish.
FIG. 3 indicates means for utilizing the equipment of FIG. 2 to compensate for a plurality of blemishes.

Referring now to the drawings and in particular to FIG. 1 there is shown a view, indicated generally by the numeral 10, of the face of a video display tube, such as a television receiver. The rectangular face 11 shows a plurality of horizontal lines 12 which correspond to individual horizontal scans in the raster. The vertical lines 14 represent time intervals during the horizontal sweep. These can be generated in arbitrary units of time, or preferably can correspond to the timing of the color subcarrier signal. The heavy vertical lines 14A and 14B represent the beginning and the end of a time interval during the horizontal sweeps when the video signal is to be blanked out, and a compensating signal inserted. Similarly, the heavy horizontal lines 12A and 12B represent the horizontal scans between which and during the timing between the 14A and 14B lines, the video signal is blanked out.

FIG. 2 indicates the circuit of this invention. There are two sets of timing units indicated generally as 20A and 20B. One is for the timing in the horizontal direction of each individual sweep and the other corresponds to the timing of the vertical direction, that is, the timing of each succeeding horizontal sweep. Each timing means 20A, 20B includes a series of three counter units 22A, 24A and 26A, and a corresponding three units 22B, 24B and 26B. These comprise a units counter 22A connected by lead 30A to a tens counter 24A which is connected by lead 32A to a hundreds counter 26A. There are 10 output leads 34A from the units counter and ten leads 36A from the tens counter and at least three leads 38A from the hundreds counter. No more than three leads are required since there will be a maximum of approximately 250 to 260 counts on each counter for each complete raster or each complete picture. The signal on the input lead 28A going into the units counter 22A is the horizontal drive. This is the synchronizing pulse that starts each horizontal sweep of the raster. It is the line period, that determines the timing of each horizontal line of the picture. Thus, the timing unit 20A is concerned with the position of the blemish, or the compensating area, in a vertical direction.

The other timing unit 20B comprises a units counter 22B, a tens counter 24B, and a hundreds counter 26B similar to 20A. The input to the second counter system 20B is the color subcarrier signal. This is a series of pulses, of which there are approximately 250 on each horizontal sweep of the raster. These pulses, in effect, break up the picture in a horizontal direction into approximately 250 units. This provides an opportunity to position leading and trailing edges of the blemish compensator to within one part in approximately 250 of the width of the picture.

If this is a black and white camera, there will be no color subcarrier signal. However, a suitable frequency which is a multiple of the horizontal frequency can be provided which will give approximately 250 pulses in each horizontal sweep. Thus this invention can be used with all kinds of cameras, that is, black and white, or color, although the use with color cameras is facilitated since the color subcarrier signal is already provided.

An AND gate 48A is provided with three input leads 42A, 44A and 46A. One lead 42A is connected to one of the ten leads 34A of the units counter 22A. The second lead 44A is connected to one of the ten leads 36A of the tens counter 24A and the third 46A is connected to one of the two leads 38A of the hundreds counter 26A. Thus, by choosing a combination of leads, one from each of the counters, it is possible to determine a total count representing a specific point in the raster on the display tube at which all of the three leads 42A, 44A, 46A on the AND gate 48A will be logical and this will put a logical 1 on lead 49A. This lead goes to a flip-flop 52A, and the logical 1 will set the flip-flop, and will create a logical 1 on the Q lead 54A.

There is another lead 50A, which is connected to another selected one of the ten leads 34A of the units counter. Lead 50A goes to the reset terminal R of the flip-flop 52A. The action is that a logical 1 on lead 42A in combination with appropriate voltages on leads 44A and 46A will set the flip-flop 52A to provide a logical 1 on the output 54A. Sometime later, represented by the number of unit counts before the counter voltage goes to the terminal to which the lead 50A is connected, a logical 1 signal will appear on line 50A. This will reset the flip-flop and remove the logical 1 signal from 54A. Thus, there will be a square voltage pulse on the lead 54A of positive voltage, and duration from one to nine counts of the units counter, depending on which terminals of the units counter the leads 42A and 50A are connected. The lead 42A in combination with the leads from the other two counters determine the position of the first heavy line 12A and the terminal to which lead 50A is connected determines the position of the second of the two heavy lines 12B.

Lead 40 is identified as vertical drive. This lead receives a pulse once each raster, which occurs at the instant that the first horizontal sweep line starts. This voltage on lead 40 connects to the reset terminals on each of the three counters 20A. At the start of each raster all the counters are reset. The same vertical drive signal appears on lead 40' in the lower portion of FIG. 2, resetting the three counters 20B.

The operation of the lower half of FIG. 2 is identical with that of the upper half, except that the pulses going to the counters on lead 28A is derived from the horizontal drive, that is, the frequency corresponding to each horizontal sweep, whereas in the lower portion of FIG. 2 the counters 20B receive pulses of higher frequency on lead 28B in synchronism with the color subcarrier signal.

The two flip-flops 52A and 52B produce, during each raster, logical 1 signals on the output Q leads 54A and 54B which represent in terms of time, the boundaries of the rectangular area A on the display tube of FIG. 1. When the two square wave pulses on leads 54A and 54B occur together, that is, when there is logical 1 signal on the two inputs to the AND gate 56, the output lead 58 will also have a logical 1. This goes to switch 72 which has two positions, one going to lead 74 and the other to lead 76.

The voltage on line 60 is the video signal from the camera tube. This goes to a first video amplifier 62, which is connected to a sample and hold 64, the output of which goes by lead 65 to a second video amplifier 66, and to an output lead 68, which goes to the output of the camera. The lead 65 has a very small capacitor 69 connected to ground 70. The value of the capacitor 69 is of the order of picofarads. The output lead 63 from the first video amplifier 62 has a low impedance to ground. The input lead to the second video amplifier 66 has a high impedence to ground. Whatever voltage there is on capacitor 69 is sufficient to control the second video amplifier 66 because it has an extremely high impedence input.

The sample and hold unit 64 is simply an electric switch which, whenever there is a pulse on line 74 opens the circuit between the lead 63 and lead 65. When the circuit through the sample and hold 64 is closed, the low impedance output on lead 63 controls the voltage going into the second video amplifier 66. However, when the circuit is opened between leads 64 and 65, the capacitor 69 which has been floating on the lead 64, and at all times represents the voltage on lead 65, controls the video amplifier during the short interval that the voltage pulse remains on the lead 74. When this voltage pulse disappears, the switch 64 closes and the video signal on lead 60 then goes straight through the two video amplifiers and out on lead 68.

It will be clear, therefore, that if the voltage pulse 74 is timed to start on each horizontal sweep between the positions 12A and 12B and during the time intervals on each horizontal sweep between the lines 14A and 14B then during the interval corresponding to this rectangular portion of the display tube, the actual camera signal on lead 60 will be blanked out, and there will be substituted a constant signal from the capacitor 69, which will be exactly the same as the immediately preceding voltage on lead 63 on each horizontal sweep at the time corresponding to the line 14A.

The question might be asked how are the lines 14A, 14B and 12A chosen so that the rectangle A will be superimposed directly on the blemish spot 16. This is accomplished by the switch 72. When the lead 58 is switched to the lead 76 it puts a square wave of voltage, controlled by rheostat 78, on the lead 68 going to the display tube. This puts a rectangle of grayness or of color corresponding to the voltage on lead 68. By selecting the particular terminals of the units, tens and hundreds counters, in each of the two sets of counters, this rectangle can be enlarged or decreased in size and can be moved to any location on the face of the display tube.

For example, assume that leads 42A, 44A, 46A and 50A are connected to individual switches so that the particular terminals on the units, tens and hundreds counters can be readily varied. Then the position of lines 14A and 14B can be moved anywhere in a horizontal direction that is desired. The same is true for the horizontal lines. Thus the size and position of the rectangle A can be adjusted until it completely covers a blemish spot 16. Thereafter, the switch 72 is connected to the lead 74 and the mechanism of FIG. 2 completely compensates automatically for the blemish 16.

The switch 72 is a manual switch. It is switched to the line 76, which is the test position, in order to provide a gray patch on the CRT that can be moved horizontally and vertically by manual adjustment of the switches on the leads 28A, 28B, 36A, 36B, 38A, 38B of the counters. This is for the purpose of presetting the boundaries of the correction area so as to cover a blemish. Then after the manual settings of the counter leads is accomplished, the switch 72 is manualy moved to lead 74, which is the operating position. In the operating position, the circuit of FIG. 2 automatically blanks the video signal from 62 and applies the signal from the sample and hold capacitor 69 to the amplifier 66 and output line 68.

Since the rectangle A can be provided in any location on the face of the display tube simply by choosing the proper terminals of the two sets of counters, a plurality of spots can be covered by having a plurality of sets of terminals. This is shown in FIG. 3. For convenience, small amplifiers 82 are provided on each of the 10 leads of the units counter 22 and on each lead there are a plurality of terminals 84A, 84B . . . 84N. The first terminal of each set can go to a first set of switches, the terminal of each set can go to a second set of switches and so on. By operating the first set of switches a first rectangular spot A can be provided. By using the second set of switches a second rectangular area can be provided of different size and different location and so on, using the same counters as the first rectangular area.

If multiple pulse systems are used in accordance with FIG. 3, additional AND gates 48A, 48B, flip-flops 52A, 52B and AND gates 56 will be required. The outputs of the gates 56 can be connected to an OR gate, as is well known, the output of which would be connected to switch 72.

It has been determined by experiment that there is always a certain amount of noise on the video lead 60 which comes from the picture tube. This momentary noise can be quite large, even though, because it is a random phenomon, it is generally unnoticed in the normal use of the video system. However, when the video signal is blanked out and there is nothing left but noise, this can become bothersome. It is therefore desirable to provide a low pass filter 86 of FIG. 4 in series with the video amplifier 62 so that the signal which is stored on the capacitor 69 is now a noise filtered signal, which appears on the output lead 68'. This low pass filtering would not be suitable for normal picture operation. So, a second video path goes from video amplifier 62 and lead 63, via lead 91, to the second video amplifier 66' and to lead 92. The lead 93 now goes to the output of the camera.

The box labeled numeral 90 is another electronic switch. The pulse from the AND gate 56, which appears on line 58 goes both to the sample and hold 64 by lead 88, and to the switch 90 by lead 89. The switch 90 acts to connect the lead 93 to the lead 92 at all times except when the voltage pulse appears on lead 58. When this happens lead 93 is connected to lead 68' which receives the voltage from capacitor 69. Since this has previously been filtered, during the short interval of the voltage pulse the signal on 68' represents a filtered version of the video signal and therefore it is a more desirable voltage to use in the rectangular area A.

Figure 4:
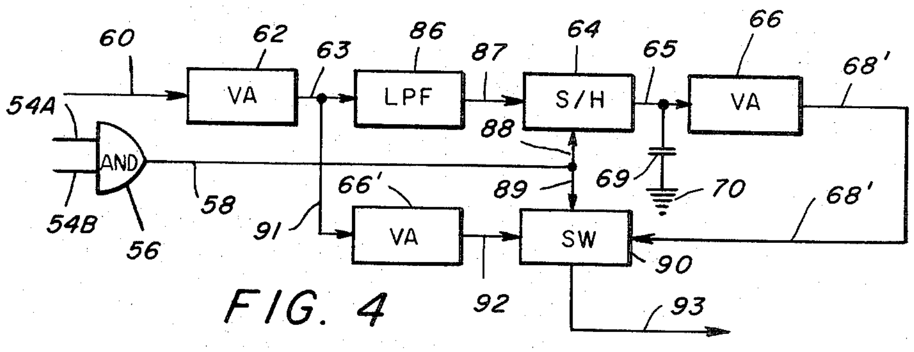
FIG. 4 indicates a modification of FIG. 2.

It will be clear that since the video system is an analog voltage system, it would equally be possible to use analog control means, as well as the digital control means which have been described in connection with FIGS. 2, 3 and 4. Therefore, this invention is intended to include the use of analog voltage control means, in conjunction with saw tooth voltages on each of the sweeps, to preset the times during which the voltage pulses will be provided by the flip-flops 52A and 52B. Any other means of generating and timing the voltage pulses on leads 54A and 54B in synchronism with the raster of the camera and display devices can, of course, be used.

As described in the operation of the embodiment of FIG. 2, the counters 20A, 20B are responsive to a selected pulse polarity, so that they respond to a selected transition of the horizontal and vertical drives. Thus the lines 12A, 12B and 14A, 14B are positioned to the nearest cycle of the respective drives. By the use of an inverter in the horizontal and vertical drives and a switch for selecting the input or the output of the inverters, the boundaries of the compensator area can be adjusted to the nearest half cycle of the respective drives.

Similarly, the horizontal drive starts with a certain polarity on the first raster, and an opposite polarity on the second interleaved raster, the picture elements on successive horizontal traces being displaced by one-half of a picture cycle. It is possible to modify the horizontal drive by using a toggle system, comprising a pair of interlocked flip-flops, one driven by the horizontal drive direct and the other through an inverter.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. In a video camera system having a camera tube with at least one blemish in the photosensitive surface, such that when the photosensitive spot being transduced is on the blemish area a distorted video signal is produced, the improvement in apparatus for compensating for said blemish, comprising:

a. first means to generate first recurrent timing pulses in synchronism with the start of each horizontal sweep;

b. second means to generate second recurrent timing pulses in accordance with the rate of horizontal sweep;

c. first counter means responsive to said first pulses;

d. second counter means responsive to said second pulses;

e. means responsive to said first counter means to generate a first control voltage pulses at a selected count and of selected pulse width;

f. means responsive to said second counter means to generate a second control voltage pulse at a selected count and of selected pulse width;

g. video amplifier means including sample and hold means connected to said camera tube; and AND gate means having as its two inputs said first and second control pulses, the output pulse of said gate means connected to said sample and hold means.

2. The video camera system as in claim 1 in which said means to generate said second timing pulses includes means responsive to said color subcarrier signal.

3. The video camera system as in claim 1 including means responsive to said gate output pulse to impress a voltage pulse of selected magnitude, synchronous with said gate pulse, on the video output signal of said camera.

4. The video camera system as in claim 1 in which said sample and hold means comprises high speed switch means connected between the low impedance output of a first video amplifier and the high impedence input of a second video amplifier, a small capacitor connected between the input of said second amplifier and ground, said switch operative to open for the duration of said gate output pulse.

5. The video camera system as in claim 1 including:

a. low pass filter means in series with said sample and hold means;

b. second video amplifier means connected to the output of said camera tube; and c. switch means responsive to the output pulse of said gate means for alternatively connecting the output of said camera system to said first and to said second video amplifier means.

6. The video camera system as in claim 1 including:

a. second means as in (e);

b. second means as in (f);

c. second AND gate means as in (h); and d. OR gate means for connecting the outputs of said first and second AND gate means to said sample and hold means.

* * * * *